United States Patent Office 3,050,463
Patented Aug. 21, 1962

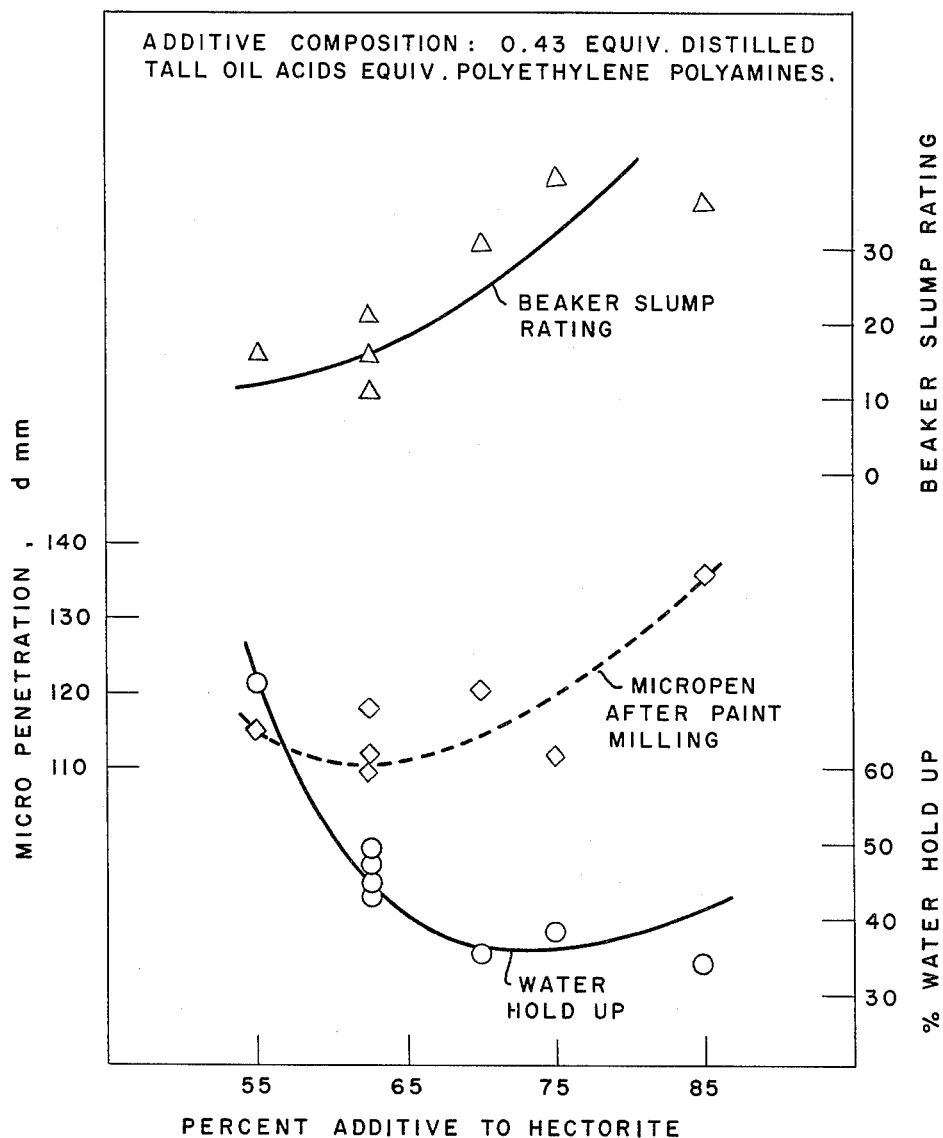
FIG. I
GREASE PROPERTIES FOR VARIED SURFACTANT : HECTORITE RATIOS

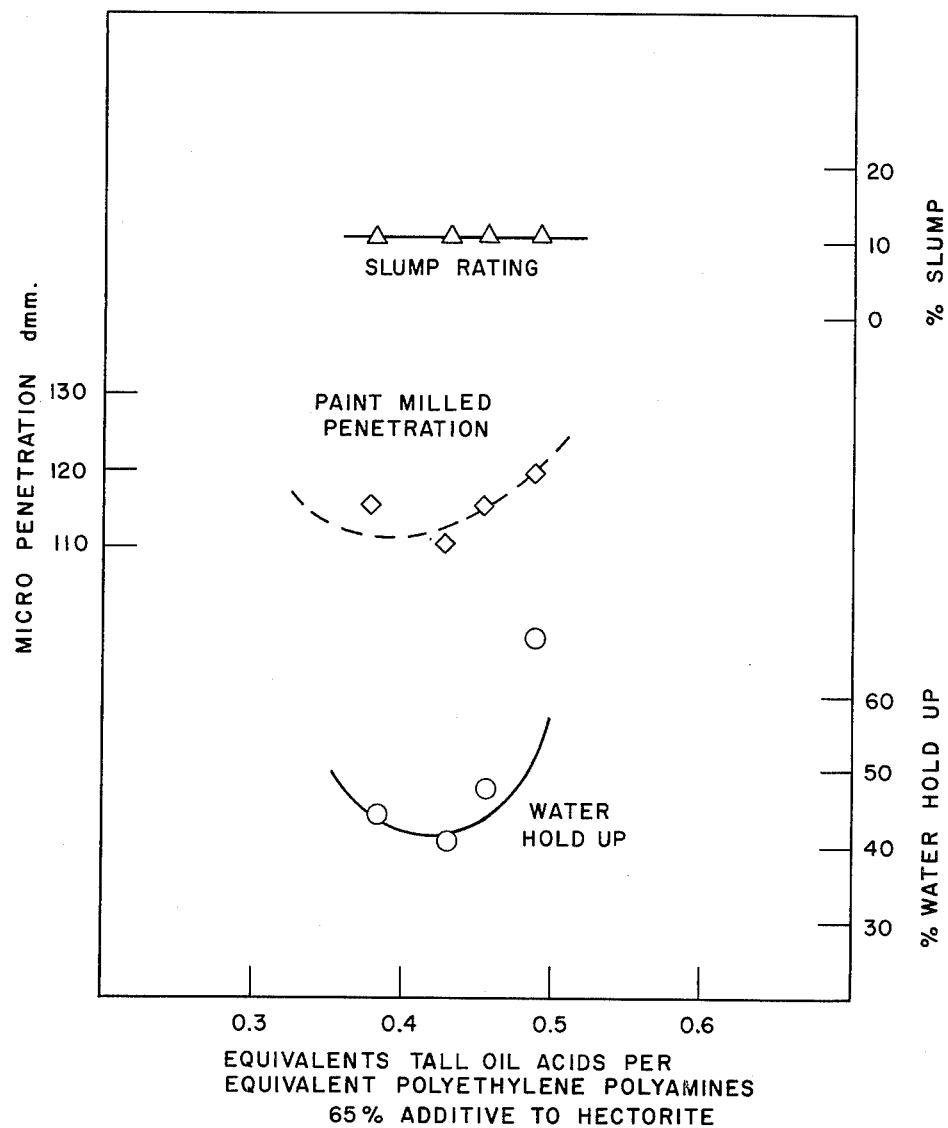
FIG. II
GREASE PROPERTIES FOR VARIED FATTY
ACID : POLYAMINE RATIOS
INVENTOR:
WALTER H. PETERSON
BY: *William H. Myers*
HIS AGENT

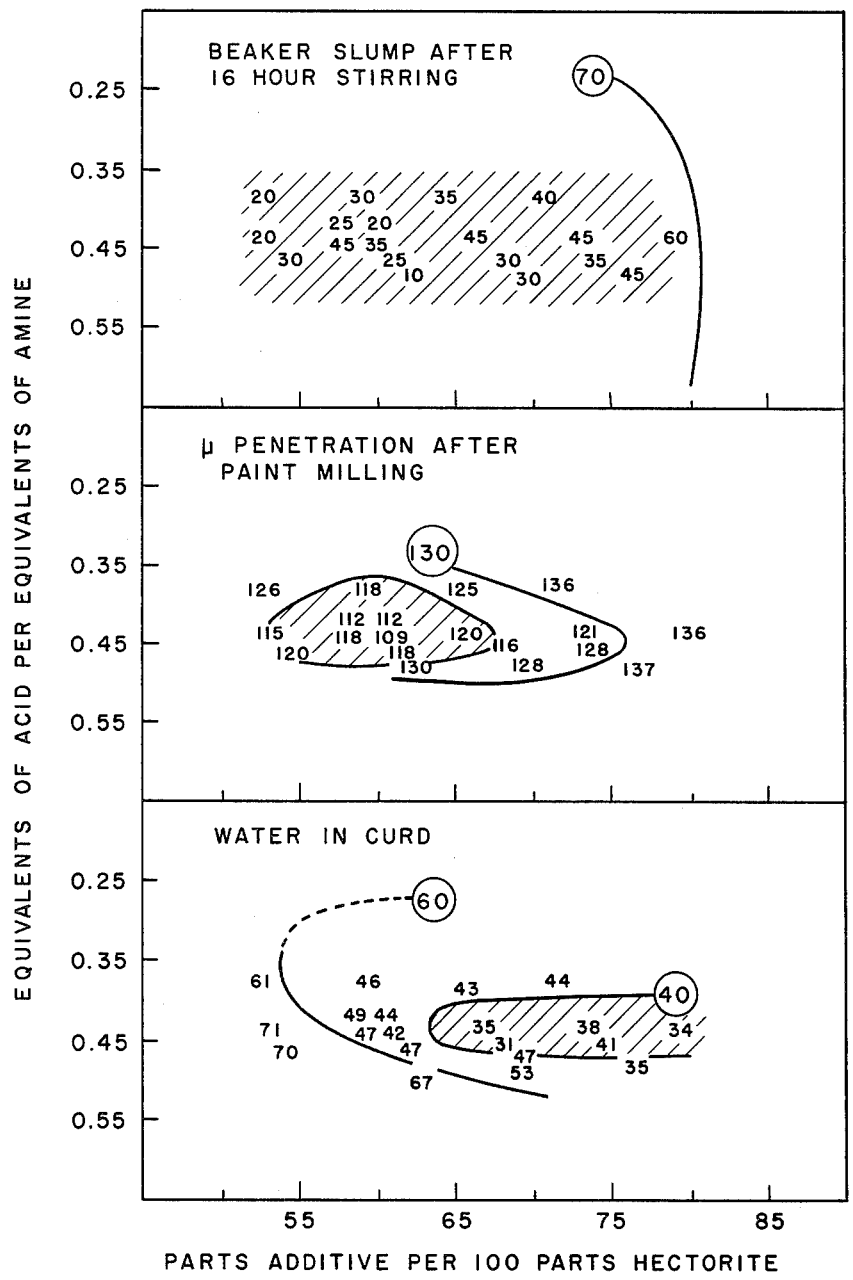
FIG. III
AREA OF OPTIMUM PERFORMANCE

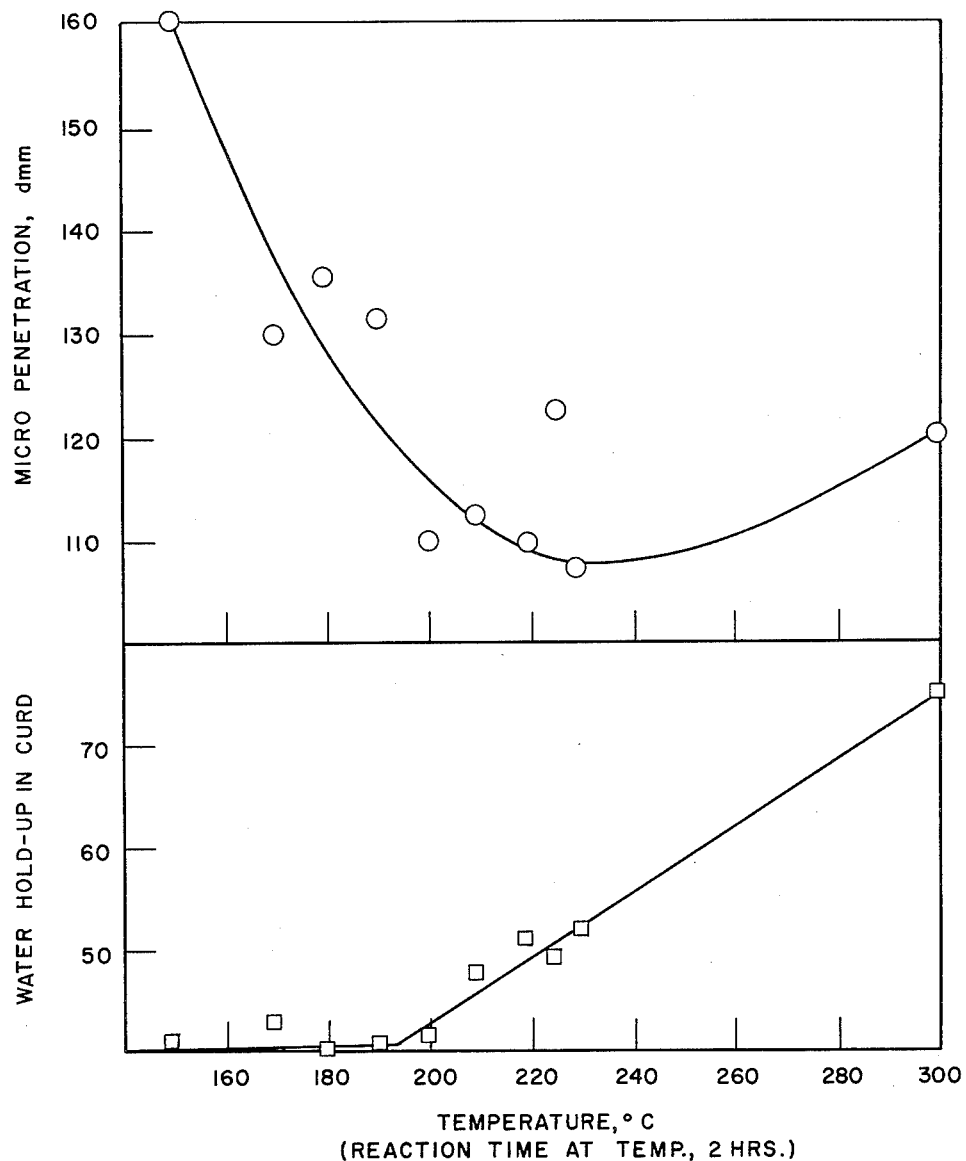
FIG. IV
GREASE PREPARATION FOR VARIED
AMIDIZING TEMPERATURES
INVENTOR:
WALTER H. PETERSON
BY: *William H. Myers*
HIS AGENT

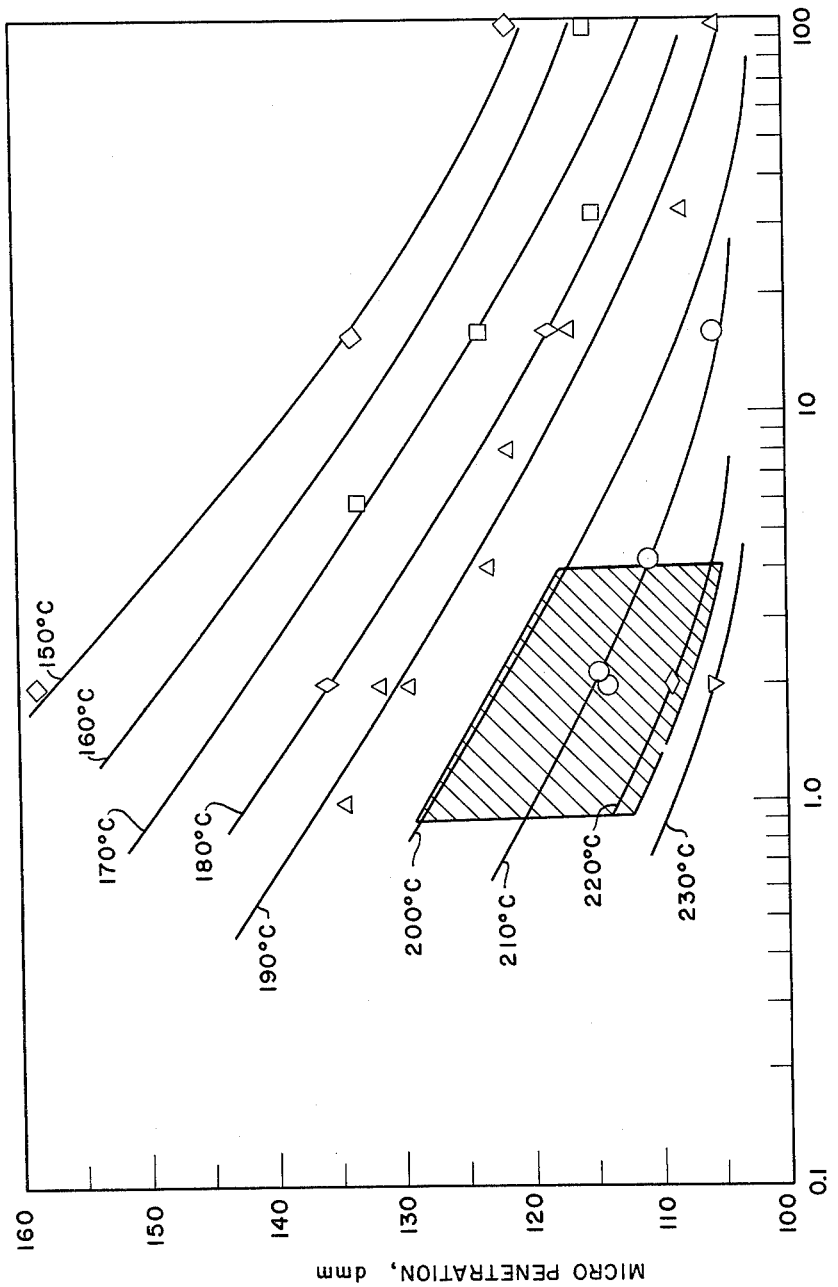
FIG. V
GREASE PENETRATIONS AS RELATED TO ANIDIZING CONDITIONS

---

3,050,463
CLAY GREASE COMPOSITIONS
Walter H. Peterson, Point Richmond, Calif., assignor to Shell Oil Company, New York, N.Y., a corporation of Delaware
Filed Feb. 18, 1960, Ser. No. 9,654
7 Claims. (Cl. 252—28)

This invention relates to a water resistant grease composition in which the thickening agent is a bentonitic clay.

Grease compositions have been developed wherein the gelling agent is a colloid of inorganic origin, such as clay. While these clays form greases having good lubricating properties, they often suffer from the disadvantage of being sensitive to destruction by the action of water. This property has been corrected to a certain extent by reaction with or adsorption of a hydrophobic cationic material, such as an ammonium compound or a high molecular weight amine. However, the resulting grease compositions possess certain properties which are undesirable in a lubricating grease. For example, the so-called "onium clays" form greases which are somewhat corrosive and are prone to emulsification in the presence of water. Ordinary amines provide clay greases with hydrophobic properties but tend to cause slumping of a grease, such as in wheel bearings and the like.

One of the chief disadvantages of most clay greases comprises the expense of the preparation not only with respect to the steps involved in the grease making process but also in regard to the cost of the individual components. In most instances, the lubricating oil and the clay are the two less costly materials, while the waterproofing agent is normally the most expensive ingredient. Since it is necessary to employ amounts of waterproofing material in amounts from 40–100% by weight of the clay gelling agent, it is desirable to utilize a waterproofant having as low a cost as possible while at the same time the properties of the resulting grease are either maintained or improved.

A number of methods have been proposed for the preparation of clay greases. The method eventually selected is usually dependent upon the particular properties of the waterproofing agent insofar as it affects the utilization or necessity for specific processing operations. For example, formation of an onium clay normally requires reaction in an aqueous medium between a clay and an onium salt. The by-product, salt which will normally be an alkali metal halide, must be removed by washing after which the onium clay is normally dried and ground and thereafter incorporated in an anhydrous lubricating oil. These several operations are objectionable if it is at all possible to prepare a grease without water-washing operations and the dehydration and grounding steps.

In the case of onium clays, it is essential to proceed as described above since this is the only means for producing an onium clay which will in turn swell greatly in certain organic liquids, such as in nitrobenzene. This indicates the nature of the product when dispersed in lubricating oils, wherein it apparently forms a highly swollen matrix in which the oil is dispersed.

Grease compositions in which the clay bears adsorbed amine (rather than being an onium clay) can be made more efficiently since it is possible to disperse the clay in water, add thereto the hydrophobing agent and oil, thus causing separation of a portion of the water which can then be easily removed, such as by decantation and thereafter dehydrating the grease.

While this process is more efficient and therefore more desirable, certain limitations appear when specific hydrophobing agents are employed. Many of the amines or amino amides previously utilized are high melting solids and therefore difficult to handle on a plant scale at temperatures found to be most desirable for the process as outlined immediately above. It is normally necessary to melt the additive or to disperse it in a solvent, either of which steps are undesirable if they can be avoided. Moreover, the nature of the product which separates from a portion of the water varies widely depending upon the specific additive being employed. It is most desirable to add the hydrophobing agent and oil to the clay dispersed in water and thereby form a fairly firm curd which will readily separate from the large portion of the water and can be handled without ready redispersal in water or without plugging screens or filters. If the desirable firm curd is obtained, processing difficulties are minimized and a sharper separation of water can be effected.

It is an object of the present invention to provide improved clay grease compositions.

It is another object of the invention to provide an improved process for the preparation of clay greases.

A particular object of the invention is to provide a new class of hydrophobing agents for clay grease compositions.

It is a further object of the invention to provide a hydrophobing agent which is a non-solid at the temperature of the grease formation.

A further object of the invention is to provide a limited class of hydrophobing agents which cause the formation of firm curds in the grease-making process.

A further object of the invention comprises the preparation of greases having improved slumping characteristics.

A further particular object comprises the preparation of greases wherein the cost of components is substantially reduced. Other objects will be apparent from the description of the invention.

Now, in accordance with the present invention it has been found that improved clay grease compositions are provided comprising a major amount of a lubricating oil gelled with a bentonitic clay having strongly absorbed thereon hydrophobic amino amides formed between fatty acids having 16–20 carbon atoms per molecule, at least 50% by weight of the fatty acids containing at least 1 double bond per molecule or substantially saturated fatty acids having 10–14 carbon atoms per molecule or mixtures of these two groups of fatty acids, and a mixture of polyethylene polyamines, 20–80% by weight of the mixture comprising diethylene triamine, the remaining fraction being polyethylene polyamines having an average molecular weight within the range 250–400, said amino amides having been formed by heating 0.4–0.5 equivalents of fatty acid for each equivalent of polyamine at a temperature between 200 and 225° C. for a reaction period of 1–4 hours. Still in accordance with the present invention, an improved process comprises the use of the described class of amino amides not only as the waterproofing agent for the clay grease but also as the transferring agent by means of which clay can be transferred from water into oil as more particularly described hereinafter. This is especially advantageous since the amino amides are non-solids at the temperatures involved and form a relatively firm curd with the clay and oil so that sharp separation of water occurs.

The use of saturated acids provides substantially prolonged oxidation resistance which is reflected in exceptionally high operating performance. Data obtained in dynamic and static testing of such greases are given in the working examples.

The invention will be more fully understood by reference to the accompanying drawings which form a part of this specification, and wherein:

FIG. I is a graph showing the affect of various surfactant:hectorite ratios on certain grease properties;

FIG. II is a graph showing the effect of varied fatty acid:polyamine ratios on grease properties;

Fig. III is a graph showing areas of optimum performance;

FIG. IV is a graph showing grease properties for varied amidizing temperatures; and FIG. V is a graph of grease penetrations as related to amidizing conditions.

The surface active agents utilized in accordance with the present invention may be generally defined as amino amides of polyethylene polyamines. However, in accordance with the present invention, it has been found advantageous with respect to the eventual properties of the grease to utilize only certain specific narrow ranges of ratios of fatty acid to amine, a certain narrow range of molecular weight of the polyethylene polyamines, a restricted range of fatty acids, and a critically limited time and temperature of amidizing the polyethylene polyamines with the fatty acids. Preferably, also there is an optimum ratio of surfactant to be utilized with the bentonitic clays in order to obtain the best properties of the grease and at the same time enable the use of compositions having reduced cost and improved operating properties.

The polyethylene polyamines forming the basis of the surfactants employed comprise 20–80% by weight of polyethylene polyamines having average molecular weights in the range 250–400. These high molecular weight polyethylene polyamines normally start with tetraethylene pentamine and have related higher polymers which increase in complexity with increasing molecular weight. The remaining 80–20% of the mixture of polyamines is diethylene triamine employed in such proportion that the mixture is a fluid at about room temperature (60–90° F.).

The mixture of high molecular weight polyethylene polyamines is normally obtained as a bottoms product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% of diethylene triamine has the following analysis:

Percent by weight
Carbon _____ 51.5
Nitrogen _____ 34.3
Hydrogen _____ 11.6
Oxygen _____ 2.5

Total basicity, equivalents per 100 grams=1.98, equivalent to 27.7% nitrogen.
Active nitrogen=81%.
Amine types, equivalents per 100 grams:
Primary, 1.20; tertiary, 0.30.
Specific gravity at 25° C.—0.995–1.020.
Viscosity, 75–250 centipoises.
Equivalent weight—42.5–47.5.

The fatty acids to be utilized for the formation of amido amines with the polyethylene polyamines should have 10–14 carbon atoms per molecule if substantially saturated or from 16 to about 20 carbon atoms per molecule and preferably from 17 to 19 carbon atoms if at least 50% by weight of the acids have at least one double bond per molecule. Still more preferably, if unsaturated acids are employed, all of the fatty acids contain double bonds and may have either 1 or 2 double bonds per molecule. Stearic acid may form a member of the mixture but should be present in no more than 50% by weight thereof. Linoleic and oleic acids as well as linolenic acids are preferred. The acids naturally occurring in tall oil are optimum insofar as their properties are concerned for use in the formation of the amido amines used in the present invention. Unsaturated fatty acids which are useful for this purpose are available from source materials given in Table 1.

TABLE 1

*Unsaturated, Low Cost Fatty Acids*

| Trade name | Iodine number | Sap. number mg. KOH |
|---|---|---|
| Standard bone tallow | 59 | 210 |
| Yellow grease | 52 | 217 |
| Oleic Acid | 82 | |
| Fatty acid residue | 83 | 157 |
| Tall oil fatty acid | 130 | 196 |
| Do | 138 | 192 |
| Crude tall oil | 174 | 173 |
| Distilled tall oil | 164 | 193 |
| Tall oil rosin | | 175 |

A grease having substantially greater resistance to oxidation is obtained by utilizing saturated acids in forming the amidoamine. A product which is fluid at the temperatures utilized in the grease processing steps involved is the amidoamine prepared from saturated fatty acids predominating in fatty acids having 10–14 carbon atoms per molecule. Species meeting these requirements include capric, undecylic, lauric, tridecylic and myristic acids. A suitable natural source of saturated fatty acids giving a liquid amidoamine is coconut oil.

There is a critical range of fatty acids-to-polyamine ratios which give optimum grease properties. This is shown by results obtained by utilizing a constant additive-to-clay ratio but varying the ratio of fatty acid-to-polyamine over a considerable range. FIG. II illustrates the variation in processing and product obtained by the use of varying proportions of tall oil fatty acids to the polyamines. The curves show that there is an optimum ratio with respect to water hold up at approximately 0.43 equivalents of tall oil fatty acids per equivalent of polyamine. The slump rating of the grease is apparently not affected by variation in fatty acid to amine ratio. However, the yield of the grease is influenced to a mild degree as shown by the figure. It is preferred that a ratio between about 0.42 and about 0.46 equivalents of fatty acid per equivalent of polyamine be utilized especially in view of the results as shown in FIG. II. The term "water hold up" refers to the amount of water in the clay hydrogel which does not separate upon the addition of the surfactant and oil. The low value for water hold up (in the order of 40 g. $H_{20}$ per 100 g. of grease) is desired since this must be removed by evaporation. This indicates that about 83% of water originally present in the hydrogel separated and could be removed by simple decantation or siphoning.

The use of mixtures of fatty acids containing a preponderance of unsaturated species is illustrated in Table 2. The additive formed from the use of stearic acid was a brittle solid and had a high water hold up. Even the mixture containing 20% of oleic acid was a hard solid and hence was difficult to handle in the processing. The mixture of fatty acids that contained equal parts of linoleic and oleic on the other hand was semi-fluid in character and thus was simple to handle in plant size batches and resulted in a lower water hold up in the curd which comprises surfactant clay and oil. Additives employed in the comparative greases contained in this table were those formed by amidizing the polyamine with approximately 0.43 equivalent of the fatty acid per equivalent of polyamine.

TABLE 2

*Effect of Unsaturation in Amidizing Acid*

| Type of acid | Iodine number | Condition of additive | Water in curd, percent weight |
|---|---|---|---|
| Stearic | 2 | Brittle | 64 |
| 80/20 stearic-oleic | 82 | Hard | 65 |
| 50/50 linoleic-oleic | 130 | Semi-fluid | 40–60 |

Table 3 gives the properties of greases obtained by the use of additives falling both within and outside of the present invention together with the physical condition of the additive under the conditions of its application to the clay hydrogel. It is significant to note that only those mixtures of acids containing a major amount of unsaturated acids provided amido amines which were not solids and therefore simple to handle in the processing steps. Fatty acids which predominated in stearic acid and were substantially saturated, however, caused the formation of a hard additive which required melting before it could be applied to the clay hydrogel.

polyamine, the reaction time being kept constant at two hours and the ratio of additive to clay being held constant at 0.43 equivalents of acid per each equivalent of polyamine and a weight ratio of 0.65 part of additive per part of clay being employed. The greases were compared on the basis of constant clay plus additive weight, the constant figure being 8.0% by weight based on the total grease composition. FIG. IV shows that the temperature of heating the fatty acid and polyamine has no effect upon the water hold up in the curd up to a temperature of about 190°. However, above this temperature there is a constant increase in the percentage of

TABLE 3

*Testing of Low Cost Acids*

[Clay Content, 4.85%]

| Acid tested | Additive | | Additive/clay ratio, g./g. | Water held in curd, percent weight | Micropenetration | | | Beaker slump rating | 50° stirred test | | Water emulsion | |
|---|---|---|---|---|---|---|---|---|---|---|---|---|
| | Composition eq. acid/amine | Condition | | | Initial | PW | Bosched | | μPen | Slump | Percent water absorbed | μPen |
| Standard bone tallow | 0.43 | Soft waxy solid | 56 | 59 | Fluid | 110 | 128 | 5 | 161 | 35 | 75 | 118 |
| Yellow grease | 0.43 | Waxy solid | 57 | 49 | Fluid | 94 | 113 | 10 | 138 | 15 | 75 | 100 |
| Oleic acid | 0.43 | Semi-solid | 57 | 65 | Fluid | 108 | 116 | 0 | 138 | 20 | 75 | 96 |
| Fatty acid residue | 0.43 | V. viscous fluid | 89 | 49 | | 168 | 165 | 180 | | | | |
| Animal fatty acids | 0.43 | Hard | 70 | 36 | | 178 | 105 | 165 | 20 | 172 | 30 | 60 | 80 |
| Crude tall oil acids | 0.43 | Grainy fluid | 59 | 49 | Fluid | 112 | 132 | 10 | 162 | 25 | 70 | 94 |

A stated hereinbefore, the use of the hydrophobing additives according to the present invention impart advantages not only to the process but also to the grease compositions as well. Table 4 illustrates the advantages gained as compared with the use of other commercially available amines or imidazolines as well as a quaternary ammonium compound. The first additive, which was made according to the present invention, caused the creation of a curd which was firm and had minimum water hold up. Other additives were less desirable in that soft or slimy curds were encountered, thus, complicating the processing details or they caused the retention of an undue amount of water in the curd.

TABLE 4

*Tests of Commercially Available Amines for Grease Making From Hectorite*

| Additive | Additive to clay ratio, percent weight | Curd | | Micropenetration | |
|---|---|---|---|---|---|
| | | Condition | Water held, percent weight | Initial | Paint milled |
| Additive of this invention | 65 | Firm | 33 | 175 | 108 |
| Octadecylamine | 40–120 | No curds | | | |
| N-heptadecylpropylenediamine | 63 | Slime | 98 | Fluid | Fluid |
| 1-beta-hydroxyethyl-2-heptadecenyl-imidazoline | 65 | do | 93 | Fluid | 87 |
| 2-heptadecenyl imidazoline | 75 | do | 108 | Fluid | 58 |
| 2-heptadecyl-imidazoline | 65 | do | 110 | Fluid | Fluid |

As stated hereinbefore, the fatty acids and amines are reacted to form amido amines by heating the two components together. In accordance with one phase of the invention, it has been found that an optimum temperature range exists in which amido amines are formed which impart the most satisfactory properties to greases in which they are eventually utilized. Temperatures above and below this optimum range have been found to be disadvantageous in one respect or another. This is illustrated by the curves contained in FIG. IV which show the effect of varying the temperature of heating the fatty acid and water retained in the curd and consequently, a corresponding amount of water to be eliminated from the curd. Consequently, in the absence of other changes it would be concluded that a reaction temperature below 190° C. would be preferred. However, the second curve in this figure shows that the temperature of heating affects the "yield" of the grease. In other words, the reaction temperature affects the gelling property of the clay-additive combination. The minimum penetration value is obtained when the additive has been prepared at temperatures between about 200–220° C. while lower and higher temperatures resulted in greases of softer consistency. Consequently, the optimum range of reaction temperatures should be between about 200 and 225° C. in order to take advantage of both minimum water hold up and maximum consistency improving properties.

FIG. V elaborates upon the effect upon consistency of heating the fatty acids and polyamines over a wide range of temperatures and for a wide variation in reaction time. This figure must be read in conjunction with FIG. IV since the water hold up also governs the choice of the time and temperature to be employed. The shaded area, therefore, of FIG. V constitutes the preferred heating range both in time and temperature for the preparation of additives according to the present invention.

The present invention contemplates the use of bentonitic clay, such as Wyoming bentonite or hectorite. These are both high base exchange clays having a high degree of swelling in water. In the center between the silica layers of the crystal lattice, hectorite has magnesium ions while Wyoming bentonite contains aluminum ions. The present invention is specifically directed to these clays when used in conjunction with the additives specifically defined and prepared as described herewith. When employing these restricted and specific additives described as well as the bentonitic clays, it has been determined that there is an optimum weight ratio of additive to clay in order to obtain the most satisfactory grease properties. This is illustrated in FIG. I showing the processing aspects as well as the micropenetration of clay greases wherein the clay is hectorite, the additive is amido amine formed between 0.43 equivalent of tall oil fatty acids with each equivalent of mixed polyethylene polyamine, the proportion of additive to hectorite being varied between about 55 and 85 parts of additive for every one-hundred parts by weight of clay. Optimum properties are obtained when the additive is present in proportions between about 63 and 75 parts by weight of additive for each 100 parts by weight of clay. This is true with respect to water hold up in the curds and the micropenetration of the greases obtained.

The greases are preferably prepared according to the following process, the limitations as set forth hereinbefore being designed specifically to be utilized in conjunction with this process.

Clay is dispersed in water to form a clay hydrogel of about 0.5–3% concentration. To this is added 4–20% phosphoric acid (based on dry clay weight) the hydrophobic surfactant and oil either separately or together and the resulting mixture is subjected to mild agitation such as in turbulent pipeline flow. Under these conditions the majority of water separates from the clay hydrogel, the remaining small percentage of water and all of the clay associating with the surfactant and oil in the form of a curd under the conditions as described herewith. The curds which form will be firm in nature and will present no difficulty in physical separation of the separate water phase, such as by decantation or screening. Preferably the curd and separate water phase are passed over a slowly rotating screen, the water passing through the screen and the curd flowing across the screen to a dehydrating apparatus. While this dehydrator may be simply a pot containing a stirrer, it is preferred that a thin film drying apparatus be employed wherein the curd is subjected to high speed shearing to form a film of the grease components several thousandths of an inch thick, the skin temperature of the dehydrator being such that the water is flashed out of the curd in a time from about 1 to about 30 seconds. The dehydrated grease components, either from the stirred kettle or from the thin film agitated dryer are then sent to a shearing apparatus, such as a Gaulin homogenizer or a paint mill wherein it is subjected to shearing or milling treatment for the preparation of a grease structure.

Any lubricating oil which is hydrophobic may be utilized although mineral oil is preferred. Synthetic lubricants, such as silicones diesters, phosphates, polyethers, etc. may be utilized or mixtures thereof may be employed. The proportion of clay to oil will vary from about 2% to about 20% dependent upon the consistency of the grease desired, but the ratio of surfactant to clay may vary from about 50% to about 150% based on the clay. However, as stated hereinbefore, optimum grease properties are obtained when the ratio of surfactant to clay is between about 0.63–0.75.

Table 5 demonstrates a duel benefit obtained by the use of preferred acid to polyamine ratios and the preferred surfactant to hectorite ratios. The greases given in this table contain 65% by weight of clay plus additive. FIG. III shows areas of optimum performance, the data utilized being that given in Table 5. It will be seen that there is a broad area in which this particular additive may be employed without damage to the slumpability characteristics of the grease. The areas of micropenetration and of water hold up in the curve are relatively restricted and the limitations of the present invention are based thereon.

Resistance to hardening and improvement in static and dynamic grease properties is enhanced by the presence of oxidation inhibitors and/or corrosion inhibitors. Outstanding results are obtained by the use of alkali metal nitrites or ammonium nitrites as corrosion inhibitors such as sodium nitrite, dicyclohexylammonium nitrite, diisopropylammonium nitrite and mixtures of the same. While the nitrites improve corrosion characteristics of the grease, they tend to degrade its oxidation resistance. Aliphatic dicarboxylic acids are more satisfactory since they have no effect on oxidation susceptibility and at the same time impart excellent corrosion inhibiting properties. Effective species of such acids include sebacic, adipic, azelaic, pimelic and suberic acids. The diaryl amines are preferably those in which phenyl or naphthyl radicals are directed attached to the nitrogen radical. The aryl rings may be alkylated, preferably with alkyl groups having from 1 to 10 carbon atoms each. Mixed diaryl amines may be employed or the amines may be symmetrical with regard to their configuration. The following are typical of the species to be utilized in accordance with the present invention, the preferred species being diphenylamine.

DIARYLAMINES

Diphenylamine
Di-(α-napthyl)amine
Di-(β-napthyl)amine
Phenyl-α-napthylamine
Phenyl-β-napthylamine
Bis(ethylphenyl)amine
Bis(tert-butylphenyl)amine
(α-napthyl)(β-napthyl)amine
Bis(dimethylphenyl)amine
Bis(diethylphenyl)amine
Phenyl-beta(butylnapthyl)amine For some undetermined reason, the use of diaryl amines wherein at least one of the aryl radicals is attached directly to the nitrogen atom (as in phenyl-beta-napthylamine) are more satisfactory than their alpha isomers in that they do not discolor the grease upon exposure to oxidation. Greases containing the alpha isomers often turn various shades of purple when exposed to oxidation.

Two greases were prepared utilizing an amidoamine from tall oil (Grease A) and an amidoamine from coconut oil acids (Grease B) respectively. The polyamines employed are the bottoms product from ethylene diamine manufacture diluted with 25% diethylene triamine and described in detail hereinbefore. The clay as a 2%w slurry is heated to 160° F., diluted phosphoric acid is added, followed by the amidoamine and oil. The resulting "pearls" are separated from the water layer and heated with gentle stirring to 260° F. for 15 to 20 minutes to remove the water. The oxidation inhibitor and amidoamine (to prevent moisture hardening) are then stirred in and the grease is cooled and milled.

| | Grease A | Grease B |
|---|---|---|
| Formulas, percent weight: | | |
| Hectorite clay | 6.59 | 5.05 |
| Phosphoric acid, 85% | 0.52 | 0.35 |
| Tall oil amidoamine | 3.94 | |
| Coconut oil amidoamine | | 2.85 |
| HVI 500 neutral | 87.85 | 89.75 |
| Sodium nitrite | 0.60 | |
| Sodium sebacate | | 1.00 |
| Phenyl alpha napthylamine | 0.50 | |
| Phenyl beta napthylamine | | 1.00 |
| | 100.0 | 100.0 |
| Extra tall oil amide | 0.75 | |
| Extra coconut oil amide | | 0.75 |
| Test results: | | |
| Bomb oxidation test: Pressure decrease after— | | |
| 100 hrs., p.s.i | 12 | 7 |
| 300 hrs., p.s.i | 22 | 9 |
| 500 hrs., p.s.i | 25 | 11 |
| Wheel bearing test, 275° F., 660 r.p.m.: | | |
| 1/2 scale penetration— | | |
| Before test | 95 | 77 |
| After test | 121 | 98 |
| Leakage, g | 2.0 | 0.4 |
| Rating | Good | Excellent |
| 4 bearing test, 300° F., 3,600 r.p.m.: (80 lb. axial load 200 lb. radial load), time for failure, hr. avg. | 800 | 1,440 |

The amidoamines were prepared with sufficient fatty acid to form amides with 42% of the diluted polyamine bottoms product previously described, the reaction mixture being heated for 2 hours at 210° C.

TABLE 5
*Composition and Properties of Clay Greases*

| Tall oil ratio acids/amine equivalents | Ratio amide/ hectorite, percent | Curd appearance | Water hold-up in curd, percent | Micropenetration ||| Beaker slump, coverage percent | Stirred, 50° C., 16 hr. || Water emulsion ||
|---|---|---|---|---|---|---|---|---|---|---|---|
| | | | | Initial | Paint milled | Bosch pumped | | μPen. | Slump | Percent uptake | μPen. |
| 0.38 | 53 | Firm | 61 | Fluid | 126 | 151 | 15 | 173 | 20 | 75 | 100 |
| 0.38 | 59 | ----do---- | 46 | Fluid | 118 | 144 | 10 | 175 | 30 | 55 | 90 |
| 0.38 | 65 | Soft, loose | 43 | Fluid | 125 | 138 | 5 | 183 | 35 | 50 | 94 |
| 0.38 | 71 | ----do---- | 44 | Fluid | 136 | 154 | 20 | 169 | 40 | 53 | 103 |
| 0.435 | 53 | Sl. soft | 71 | Fluid | 115 | 132 | 15 | 162 | 20 | 75 | 94 |
| 0.435 | 59 | Firm | 49 | Fluid | 112 | 132 | 10 | 162 | 25 | 70 | 94 |
| 0.435 | 59 | ----do---- | 44 | Fluid | 112 | 132 | 10 | 144 | 20 | 65 | 89 |
| 0.435 | 59 | Soft, firm | 42 | Fluid | 118 | 139 | 20 | 185 | 45 | 55 | 89 |
| 0.435 | 59 | ----do---- | 47 | Fluid | 109 | 117 | 15 | 173 | 35 | | |
| 0.435 | 66 | Firm | 35 | 214 | 120 | 150 | 30 | 169 | 45 | 45 | 89 |
| 0.435 | 73 | ----do---- | 38 | 237 | 121 | 153 | 30 | 172 | 45 | 35 | 87 |
| 0.435 | 79 | ----do---- | 34 | 212 | 136 | 152 | 35 | 193 | 60 | 35 | 91 |
| 0.455 | 54 | Soft | 70 | Fluid | 120 | 129 | 15 | 171 | 30 | 75 | 97 |
| 0.455 | 61 | Firm | 47 | Fluid | 118 | 133 | 10 | 175 | 25 | 65 | 92 |
| 0.455 | 68 | ----do---- | 31 | Fluid | 116 | 139 | 20 | 179 | 30 | ---- | --- |
| 0.455 | 74 | ----do---- | 41 | Fluid | 128 | 161 | 15 | 176 | 35 | 60 | 99 |
| 0.48 | 62 | Soft, firm | 67 | Fluid | 130 | 141 | 10 | 161 | 10 | 70 | 90 |
| 0.48 | 62 | V. soft | 131 | Fluid | 142 | | ---- | ---- | ---- | ---- | --- |
| 0.48 | 62 | Soft | 105 | Fluid | 135 | | ---- | ---- | ---- | ---- | --- |
| 0.48 | 69 | Firm | 47 | Fluid | 128 | 171 | 10 | 178 | 30 | 50 | 87 |
| 0.48 | 69 | Soft | 53 | Fluid | 107 | | ---- | ---- | ---- | ---- | --- |
| 0.48 | 76 | Firm | 35 | Fluid | 137 | 168 | 30 | 189 | 45 | 50 | 95 |

This application is a continuation-in-part of application Serial No. 737,609, filed May 26, 1958, now abandoned.

I claim as my invention:

1. A water-resistant thickened lubricant composition consisting essentially of a hydrophobic lubricating oil as the major component, a bentonitic clay colloidally dispersed therein and imparting a grease-like consistency thereto as a minor component, and oil-soluble, water-insoluble amino amide formed between fatty acids having 16-20 carbon atoms per molecule, at least 50% by weight of the fatty acids containing at least 1 double bond per molecule and a mixture of polyethylene polyamines, 20-80% by weight of the mixture comprising diethylene triamine, the remaining fraction being polyethylene polyamines having an average molecular weight within the range 250-400, said amino amides having been formed by heating 0.4-0.5 equivalents of fatty acid for each equivalent of polyamine at a temperature between 200 and 225° C. for a reaction time of 1-4 hours, said amino amides being present in an amount less than the clay and imparting stability against deterioration by water.

2. The process for the preparation of a grease composition which comprises dispersing a bentonitic clay in water, adding thereto between about 0.05 and about 0.08 part by weight of phosphoric acid per part of clay, mixing therewith a major proportion of hydrophobic lubricating oil and a minor proportion of oil-soluble, water-insoluble amino amides formed between fatty acids having 16-20 carbon atoms per molecule, at least 50% by weight of the fatty acids containing at least 1 double bond per molecule and a mixture of polyethylene polyamines, 20-80% by weight of the mixture comprising diethylene triamine, the remaining fraction being polyethylene polyamines having an average molecular weight within the range 250-400 obtained as a bottoms product in the preparation of ethylene diamine, said amino amides having been formed by heating 0.4-0.5 equivalents of fatty acid for each equivalent of polyamine at a temperature between 200 and 225° C. for a reaction time of 1-4 hours, subjecting the mixture to mixing sufficient to cause water to separate from water-containing curds of oil, clay and amides, removing the separate water phase, evaporating substantially all of the water from the curds and subjecting the remaining grease-forming ingredients to shearing action, whereby a grease structure is formed.

3. A grease composition according to claim 1 wherein the weight ratio of amino amides to clay is between about 0.63:1 and about 0.75:1.

4. A process according to claim 2 wherein the weight ratio of amino amides to clay is between about 0.63:1 to 0.75:1.

5. A water-resistant thickened lubricant composition consisting essentially of a hydrophobic lubricating oil as the major component, a bentonitic clay colloidally dispersed therein imparting a grease-like consistency thereto as a minor component, and an oil-soluble, water-insoluble amino amide formed between fatty acids of the group consisting of substantially saturated acids (A) having 10-14 carbon atoms per molecule fatty acids (B) having 16-20 carbon atoms per molecule, at least 50% by weight of fatty acids (B) containing at least 1 double bond per molecule, and mixtures of the same, and a mixture of polyethylene polyamines, 20-80% by weight of the mixture comprising diethylene triamine, the remaining fraction being polyethylene polyamines having an average molecular weight within the range 250-400 obtained as a bottoms product in the preparation of the ethylene diamine, said amino amides having been formed by heating 0.4-0.5 equivalents of fatty acid for each equivalent of polyamine at a temperature between 200 and 225° C. for a reaction time of 1-4 hours, said amino amides being present in an amount less than the clay and imparting stability against deterioration by water.

6. A water-resistant thickened lubricant composition consisting essentially of a hydrophobic lubricating oil as the major component, a bentonitic clay colloidally dispersed therein imparting a grease-like consistency thereto as a minor component, and an oil-soluble, water-insoluble amino amide formed between substantially saturated fatty acids having 10-14 carbon atoms per molecule and a mixture of polyethylene polyamines, 20-80% by weight of the mixture comprising diethylene triamine, the remaining fraction being polyethylene polyamines having an average molecular weight within the range 250-400 obtained as a bottoms product in the preparation of ethylene diamine, said amino amides having been formed by heating 0.4-0.5 equivalents of fatty acid for each equivalent of polyamine at a temperature between 200 and 225° C. for a reaction time of 1-4 hours, said amino amides being present in an amount less than the clay and imparting stability against deterioration by water.

7. A grease composition according to claim 6 wherein the fatty acids are coconut oil fatty acids.

References Cited in the file of this patent

UNITED STATES PATENTS

| | | |
|---|---|---|
| 2,623,852 | Peterson | Dec. 30, 1952 |
| 2,623,853 | Stross | Dec. 30, 1952 |
| 2,648,633 | Peterson et al. | Aug. 11, 1953 |
| 2,748,081 | Peterson et al. | May 29, 1956 |